T. F. McGANN.
Gas-Shade Support.

No. 168,761.                                          Patented Oct. 11, 1875.

WITNESSES
H. Bates
Colborne Brookes

INVENTOR
T. F. McGann
J. C. Lathrop
ATTORNEY

UNITED STATES PATENT OFFICE.

THOMAS F. McGANN, OF BOSTON, MASSACHUSETTS.

IMPROVEMENT IN GAS-SHADE SUPPORTS.

Specification forming part of Letters Patent No. 168,761, dated October 11, 1875; application filed September 28, 1875.

*To all whom it may concern:*

Be it known that I, THOMAS F. McGANN, of Boston, in the county of Suffolk and State of Massachusetts, have invented certain new and useful Improvements for Supporting Gas-Shades; and I do hereby declare that the following is a full, clear, and exact description thereof, which will enable others skilled in the art to which it pertains to make and use the same, reference being had to the accompanying drawing, and to the letters of reference marked thereon, which form a part of this specification:

My invention relates to improvements in globe-holders for gas-brackets, chandeliers, and other similar devices, the nature of which will be fully explained by reference to the accompanying drawings, in which—

Figure 1:
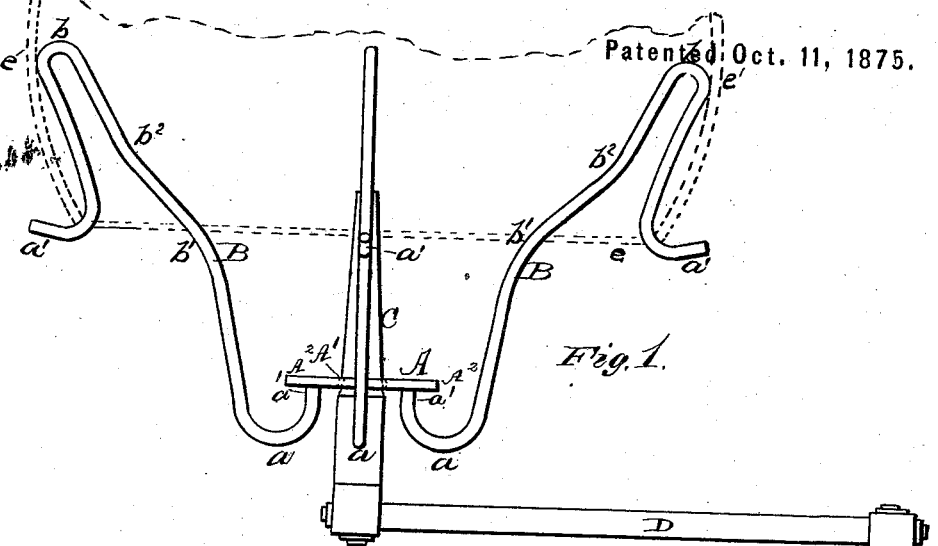
Figure 2:
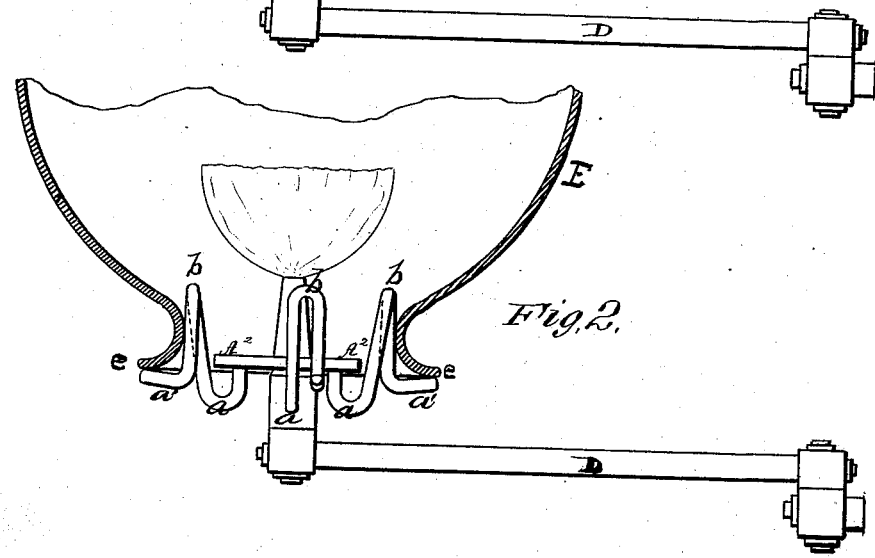

Figure 1 represents a side view of my improved globe-holder applied to a gas-burner. Fig. 2 represents a side view, and Fig. 3 a plan, of a slight modification of the same.

In each of the views similar letters of reference are employed to indicate corresponding parts wherever they occur.

A represents a bearing-piece, formed with a central opening, $A^1$, adapted to be received, and rest upon the exterior surface of a gas-burner, C, supported by a bracket or arm of a chandelier or other similar device, D. The bearing-piece A is formed with a series of projections, $A^2$, each formed so as to receive and hold the end $a'$ of a series of bent supports, B. The supports B are each formed so as to bend down from the bearing-piece A, as shown at $a$, from which point they are conducted upward and slightly outward to the point $b^1$, where they are still further bent outward and continued to the point $b^2$, where they are bent slightly in the opposite direction, and formed so as to incline still further outward and upward to the point $b$, where they are turned over and bent down in such manner as to incline inward toward the center until they reach the point $a'$, where they are turned outward and slightly upward, so that the parts $a'$ shall form bearings for the under side $e$ of the globe E, while the top portion $b$ rests against the inside of the globe, as shown at $e'$.

Figure 3:
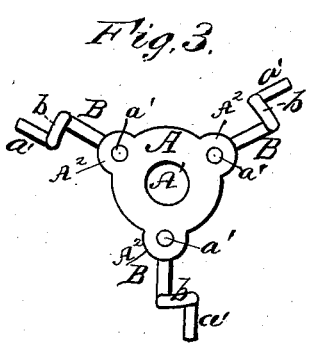

In Fig. 1 I have shown my device particularly adapted for holding globes which have no flange, while in Figs. 2 and 3 I have shown a slight modification of my improved device adapted to hold flanged globes.

By thus constructing holders for globes, I am enabled to dispense with the use of screws, clips, or other retaining devices, the peculiar formation of the supports B not only serving to support the globes, but also to hold the same safely in position and prevent their accidentally falling or being knocked off. The spring-supports B also by their peculiar construction are adapted readily to spring inward, so as to allow of a globe being placed upon them, as shown by the drawings.

I am aware that chimney and shade holders have been made with bent spring-arms in the shape of an S at their extreme ends for impinging the inner surface of the chimney or shade without flange, and therefore do not lay claim to this; but What I do claim is—

A globe-holder, with a bearing-piece, A, having projections, and a series of bent spring-supports, B, the bent spring-supports B being formed at $a'$ to support the under side of the globe E, and at $b$, to embrace the inside thereof, the whole being constructed substantially as shown and described.

In testimony that I claim the foregoing as my own invention I affix my signature in presence of two witnesses.

THOMAS F. McGANN.

Witnesses:
JOHN J. KELLEHER,
JOHN ROBINSON.